United States Patent

Sawaguchi et al.

[11] Patent Number: 5,932,340
[45] Date of Patent: Aug. 3, 1999

[54] MAGNETIC RECORDING MEDIUM

[75] Inventors: Masahiro Sawaguchi; Hiroshi Kudo; Takeshi Koizumi; Yuko Abe; Kazuhiko Suzuki, all of Miyagi, Japan

[73] Assignee: Sony Corporation, Tokyo, Japan

[21] Appl. No.: 09/086,128

[22] Filed: May 28, 1998

Related U.S. Application Data

[63] Continuation of application No. 08/705,274, Aug. 29, 1996.

[30] Foreign Application Priority Data

Aug. 31, 1995 [JP] Japan ............................. P07-224080
May 21, 1996 [JP] Japan ............................. P08-125818

[51] Int. Cl.$^6$ ................................................... G11B 5/702
[52] U.S. Cl. ...................... 428/323; 428/425.9; 428/532; 428/694 BG; 428/624 BU; 428/694 BL; 428/694 BF; 428/694 BP; 428/900
[58] Field of Search ................................ 428/323, 425.9, 428/423.1, 532, 694 BG, 694 BU, 694 BL, 694 BF, 694 BP, 900

[56] References Cited

U.S. PATENT DOCUMENTS

| | | | |
|---|---|---|---|
| 4,409,300 | 10/1983 | Ohkawa et al. | 428/695 |
| 4,411,956 | 10/1983 | Matsufuji et al. | 428/425.9 |
| 4,560,456 | 12/1985 | Heil et al. | 204/159.14 |

*Primary Examiner*—Stevan A. Resan
*Attorney, Agent, or Firm*—Hill & Simpson

[57] ABSTRACT

A magnetic recording medium exhibiting not only good durability and traveling reliability but also improved static magnetic properties and electromagnetic transduction characteristics can be obtained according to the present invention. The magnetic recording medium includes a non-magnetic substrate and a magnetic layer composed of a magnetic powder, a binder and a lubricant, wherein the binder contains not less than 50% by weight of a polyester-polyurethane resin having a number-average molecular weight (Mn) of not greater than 15,000 and a ratio of a weight-average molecular weight (Mw) to the number-average molecular weight (Mn) of not smaller than 2.5.

3 Claims, No Drawings

MAGNETIC RECORDING MEDIUM

CROSS-REFERENCE TO RELATED APPLICATION

This Application is a Continuation of prior application Ser. No. 08/705,274, filed Aug. 29, 1996.

BACKGROUND OF THE INVENTION

1. Field of the Invention

The present invention relates to a so-called coating-type magnetic recording medium having a magnetic layer which is formed by applying a coating material composed of a magnetic powder, a binder and a lubricant, onto a non-magnetic substrate.

2. Prior Art

Hitherto, so-called coating-type magnetic recording media produced by applying a coating material composed of a magnetic powder, a binder and a lubricant onto a non-magnetic substrate, have been widely utilized.

In this type of the magnetic recording media, it is general to use the binder composed mainly of vinyl-based resins such as vinyl chloride or vinyl acetate or copolymers thereof, cellulose-based resins, polyurethane-based resins, or the like. In general, these resins may be used singly or in the form of a mixture thereof in an optional combination depending upon aimed uses therefor.

For example, in the case where vinyl chloride-vinyl acetate copolymer which is a typical one of the vinyl-based resins is used, the binder exhibits a high elasticity and a good cross-linking ability so that a magnetic recording medium having a high durability and a good traveling performance can be obtained. However, the binder is unsatisfactory in dispersibility of the magnetic powder.

Similarly, in the case where nitrocellulose which is a typical one of the cellulose resins is used as the binder, it is impossible to absorb (admix) a high concentration of the magnetic powder therein, which is required to obtain a high dispersibility of the magnetic powder therein, because of its molecular structure. This leads to a limited application of the binder regardless of its high durability. In addition, acetyl cellulose can be used as the binder only in a limited amount from a standpoint of maintaining a good dispersibility of the magnetic powder.

Further, in the case where a polyester-polyurethane resin which is one of the polyurethane-based resins is used as the binder, various advantages such as good dispersibility of the magnetic powder, adherence to a base film as the non-magnetic substrate, etc., can be obtained. Nevertheless, the use of the polyester-polyurethane resin leads to inconveniences such as the production of the magnetic recording medium under limited conditions due to increase in viscosity of the coating material, deteriorated traveling performance and durability thereof due to increase in friction coefficient upon tape-traveling, or the like.

In order to obtain a magnetic recording medium having a high densification and a high performance, attempts have been made to further improve a fineness and a coercive force of the magnetic powder. In association with these improvements in the magnetic powder, there is an increasing demand for attaining a polymer resin which is suitable as a binder for such a magnetic powder and therefore can exhibit a high dispersibility to the magnetic powder together with a high durability or good traveling stability.

In order to attain useful binders, Japanese Patent Publication (Kokoku) No. Sho-58-41565 discloses, for example, a method in which functional groups acting for dispersing the magnetic powder is introduced into polymers for the binder. Also, there has been reported a method in which a silane-based coupling agent, a surface-modifying agent such as citric acid, etc., is added to the binder.

However, in these methods, properties or performance of the resulting magnetic recording medium are greatly influenced by the conditions of the surface of the magnetic powder and the effects obtained thereby are limited to particular combinations, so that it becomes difficult to attain magnetic recording medium having optimum properties.

As described above, conventional polymer resins are still unsatisfactory in providing a binder having good properties for the magnetic recording medium.

Consequently, in conventional magnetic recording media, a plurality of kinds of the polymers have been used in combination to attain a binder having improved properties. However, in such a combination of polymers, the use of an organic solvent is unavoidably required to prepare a coating solution dissolving the polymers, or particular combinations of the polymers must be selected to attain suitable physical properties such as compatibility therebetween. The method has also posed problems such as complicated procedures upon charging of the raw materials and the like. Under these circumstances, a further improvement in the binder or the like have been demanded to provide an excellent magnetic recording medium.

SUMMARY OF THE INVENTION

It is therefore an object of the present invention to provide a magnetic recording medium having not only a good durability, a good traveling reliability and excellent physical properties but also magneto-static and electromagnetic transduction properties.

As a result of studies made by the present inventors to achieve the afore-mentioned objects, it has been found that, by using a polyester-polyurethane resin having a low molecular weight and a wide molecular-weight distribution together with a lubricant, a binder composed of such a resin can exhibit a higher dispersibility of the magnetic powder and improved magneto-static and electromagnetic transduction properties and show a good durability and good physical properties as compared with those of the conventional binder polyurethane-based binder resins.

The present invention has been accomplished on the basis of the finding.

In an aspect of the present invention, there is provided a magnetic recording medium including a non-magnetic substrate and a magnetic layer composed of a magnetic powder, a binder and a lubricant, wherein the binder contains not less than 50% by weight of a polyester-polyurethane resin having a number-average molecular weight (Mn) of not greater than 15,000 and a ratio of a weight-average molecular weight (Mw) to the number-average molecular weight (Mn) of not smaller than 2.5.

The above and other objects, features and advantages of the present invention will become more apparent from the following description when read in conjunction with the appended claims.

DETAILED DESCRIPTION OF THE INVENTION

The polyester-polyurethane resin used in a binder of a magnetic recording medium according to the present invention has a number-average molecular weight (Mn) of not greater than 15,000.

The afore-mentioned polyester-polyurethane resin itself may include functional groups known in the art. Especially, it is preferred that the polyester-polyurethane resin has at least one functional group selected from the group consisting of —$SO_4M$, —$SO_3M$, —$SO_2M$, —COOM, —$NH_2$, —$NR_2$, —$NR_3$, —OH, —$OPO_3M_2$ and —$OPO_3R_2$ where M represents a hydrogen atom or an alkali metal, and R represents an alkyl group, an alkenyl group or an alkoxy group. When the polyester-polyurethane resin has the afore-mentioned functional group, the binder composed of such a resin shows an enhanced dispersibility of the magnetic powder therein.

The functional group may be contained preferably in the range of $1.0 \times 10^{-6}$ to $1.0 \times 10^{-2}$ equivalent weights based on one gram of the polyester-polyurethane resin.

Further, the binder may contain as a part thereof a polyisocyanate-based hardening agent. The use of the hardening agent may contribute to acceleration of curing of the binder and therefore enhancement of its durability. Examples of the suitable polyisocyanate-based hardening agents may include tolylene-diisocyanate, triphenyl-methane-triisocyanate, hexamethylene-diisocyanate, reaction products of these isocyanates with polyhydric alcohol, condensates of these isocyanates, or the like.

The commercially available products of these polyisocyanate-based hardening agents may include COLONATE-L, COLONATE-HL and COLONATE-2030 which are all manufactured by Nippon Polyurethane Industries Co., Ltd., TAKENATE D-200 and TAKENATE D-202 which are both manufactured by Takeda Pharmaceutical Industries Co., Ltd., or the like. These polyisocyanate-based hardening agents may be used singly or in combination.

The amount of the binder contained in the magnetic layer can be optionally varied depending upon the respective format of the magnetic recording medium to be produced, but is preferably in the range of 15 to 40 parts by weight based on 100 parts by weight of a ferromagnetic powder used in the magnetic layer. The magnetic recording medium according to the present invention can be prepared in the following manner. First, the afore-mentioned binder, the magnetic powder, an abrasive, an anti-static agent, if desired, further together with the hardening agent, a dispersant or the like, are mixed with an organic solvent to form a dispersion as a magnetic coating material. The resulting magnetic coating material is coated onto a base film as a non-magnetic substrate, and then subjected to orientation and surface treatments followed by other steps such as incorporation thereinto.

Further, the lubricant used in the magnetic recording medium according to the present invention may be preferably composed of an ester-based lubricant having a melting point of not lower than 40° C. and a silicone oil. The use of such a lubricant can impart to the magnetic recording medium not only enhanced traveling reliability and durability but also improved tape properties having a close relation with a tape-traveling performance.

In accordance with the present invention, it is required that the ester-based lubricant has a melting point of not lower than 40° C. If the melting point of the ester-based lubricant is lower than 40° C., the traveling reliability, the durability and the tape properties having a close relation with the tape-traveling performance cannot be improved.

Furthermore, the glass transition point (Tg) of the polyester-polyurethane resin used in the present invention is preferably in the range of from 20° C. (room temperature) to 80° C.

When the glass transition point of the polyester-polyurethane resin is lower than 20° C., a slidability of the magnetic recording medium is deteriorated with the increase in friction coefficient when the magnetic recording medium is traveled along a magnetic recording head at room temperature. On the other hand, when the glass transition point is a temperature considerably higher than room temperature, for example, higher than 80° C., the magnetic recording medium is deteriorated in its traveling performance and durability.

Examples of the ferromagnetic powders usable in the present invention may include a ferromagnetic iron oxide powder such as g-$Fe_2O_3$ or $Fe3O_4$, a cobalt-containing ferromagnetic powder, a ferromagnetic chromium dioxide powder, ferromagnetic metal powders, barium ferrite, iron carbide, or the like.

Examples of the abrasives usable in the present invention may include inorganic fillers such as metal oxides, sulfides, sulfates, carbonates, nitrides, carbides, or the like.

Examples of the anti-static agents usable in the present invention may include conductive fine powders, surfactants, or the like.

Examples of the dispersants usable in the present invention may include higher fatty acids or metal salts thereof, ester-, amide- or silane-based coupling agents, titanium-based coupling agents, or the like.

EXAMPLES

The present invention is described in more detail below by way of examples.

A magnetic recording medium prepared in the following examples includes a non-magnetic substrate and a magnetic layer prepared by applying a magnetic coating material composed of a magnetic powder, a binder and lubricant onto the non-magnetic substrate. The magnetic layer serves for recording various information signals in the form of magnetic signals thereon and reproducing the signals therefrom by using a so-called magnetic recording and reproducing apparatus.

The magnetic recording medium contains, as a binder, not less than 50% by weight of a polyester-polyurethane resin having a number-average molecular weight (Mn) of not greater than 15,000 and a ratio of a weight-average molecular weight (Mw) to the number-average molecular weight (Mn) of 2.5 or higher.

Further, the magnetic recording medium contains, as a lubricant, an ester-based lubricant having a melting point of not lower than 40° C. and a silicone oil.

In the following examples and comparative examples, the number-average molecular weight (Mn) and the weight-average molecular weight (Mw) were measured by using a gel permeation chromatography (GPC). Specifically, a high-speed liquid chromatography (Model 500 manufactured by Waters corp.) equipped with a detector (Shodex RI SE-61) and columns (Shodex KF-804+KF-803+KF-802+KF-801) was used for the measurements.

In the following Examples 1 to 11, various magnetic recording media containing binders having different compositions and contents were prepared.

Example 1

| | |
|---|---|
| Ferromagnetic iron oxide powder ($\gamma$-Fe$_2$O$_3$) | 100 parts by weight |
| Binder | 20 parts by weight |
| Carbon black | 1 part by weight |
| Alumina | 2 parts by weight |
| Lubricant A | 0.5 part by weight |
| Lubricant B | 0.5 part by weight |
| Dispersant ($\gamma$-aminopropyl-triethoxysilane) | 2 parts by weight |
| Methyl ethyl ketone | 100 parts by weight |
| Toluene | 100 parts by weight |
| Cyclohexane | 100 parts by weight |

Raw materials having the afore-mentioned compositions were homogeneously mixed together while stirring (pre-mixing step) and then dispersed in a sand mill for about one hour to prepare a magnetic coating material. The thus-prepared magnetic coating material was applied on a polyester film as the non-magnetic substrate to form a magnetic layer having a thickness of 5 μm. The thus-prepared magnetic layer was oriented in a magnetic field and then dried so that a magnetic recording medium of Example 1 was obtained.

In the production of the magnetic recording medium of Example 1, the binder was composed of 50% by weight of a polyester-polyurethane resin (hereinafter referred to as "polyester-polyurethane resin A") having a number-average molecular weight (Mn) of about 24,000, a ratio of the weight-average molecular weight (Mw) to the number-average molecular weight (Mn) of about 2.0 and a glass transition point (hereinafter referred to merely as "Tg") of about 40° C. and containing about 0.040 mmol/g of a polar group "—SO$_3$Na", and 50% by weight of a polyester-polyurethane resin (hereinafter referred to as "polyester-polyurethane resin B") having a number-average molecular weight (Mn) of about 14,000, a ratio of the weight-average molecular weight (Mw) to the number-average molecular weight (Mn) of about 3.0 and Tg of about 45° C.

The lubricant A used in the magnetic recording medium of Example 1 was an ester of fatty acid and polyhydric alcohol and had a melting point of 0° C. The lubricant B was a fluorine-containing silicone oil and had a number-average molecular weight (Mn) of about 7,000.

Further, the magnetic powder had a specific surface area of about 25 m$^2$/g.

Example 2

Example 1 was repeated in the same manner as described above except that the binder was composed of 50% by weight of the polyester-polyurethane resin A and 50% by weight of a polyester-polyurethane resin (hereinafter referred to as "polyester-polyurethane resin C") having a number-average molecular weight (Mn) of about 15,000, a ratio of the weight-average molecular weight (Mw) to the number-average molecular weight (Mn) of about 2.5 and Tg of about 60° C., so that the magnetic recording medium of Example 2 was prepared.

Example 3

Example 1 was repeated in the same manner as described above except that the binder was composed of 50% by weight of the polyester-polyurethane resin A and 50% by weight of a polyester-polyurethane resin (hereinafter referred to as "polyester-polyurethane polyurethane resin D") having a number-average molecular weight (Mn) of about 14,000, a ratio of the weight-average molecular weight (Mw) to the number-average molecular weight (Mn) of about 4.0 and Tg of about 30° C. and containing a hydroxyl group(s), so that the magnetic recording medium of Example 3 was prepared.

Example 4

Example 1 was repeated in the same manner as described above except that the binder was composed of 30% by weight of the polyester-polyurethane resin A and 70% by weight of the polyester-polyurethane resin D, so that the magnetic recording medium of Example 4 was prepared.

Example 5

Example 1 was repeated in the same manner as described above except that the binder was composed of 100% by weight of the polyester-polyurethane resin B alone, so that the magnetic recording medium of Example 5 was prepared.

Example 6

Example 1 was repeated in the same manner as described above except that the binder was composed of 70% by weight of the polyester-polyurethane resin D and 30% by weight of a vinyl chloride/vinyl acetate copolymer having a number-average molecular weight (Mn) of about 35,000, a ratio of the weight-average molecular weight (Mw) to the number-average molecular weight (Mn) of about 1.8 and Tg of about 70° C., so that the magnetic recording medium of Example 6 was prepared.

Example 7

Example 1 was repeated in the same manner as described above except that the binder was composed of 70% by weight of the polyester-polyurethane resin D and 30% by weight of nitrocellulose having a number-average molecular weight (Mn) of about 28,000, a ratio of the weight-average molecular weight (Mw) to the number-average molecular weight (Mn) of about 2.3 and Tg of about 100° C., so that the magnetic recording medium of Example 7 was prepared.

Example 8

Example 1 was repeated in the same manner as described above except that the binder was composed of 70% by weight of the polyester-polyurethane resin D and 30% by weight of an acetal resin having a number-average molecular weight (Mn) of about 28,000, a ratio of the weight-average molecular weight (Mw) to the number-average molecular weight (Mn) of about 1.6 and Tg of about 105° C., so that the magnetic recording medium of Example 8 was prepared.

Example 9

Example 1 was repeated in the same manner as described above except that the binder was composed of 70% by weight of the polyester-polyurethane resin D and 30% by weight of a phenoxy resin having a number-average molecular weight (Mn) of about 24,000, a ratio of the weight-average molecular weight (Mw) to the number-average molecular weight (Mn) of about 2.3 and Tg of about 950° C., so that the magnetic recording medium of Example 9 was prepared.

Example 10

Example 1 was repeated in the same manner as described above except that the binder was composed of 70% by weight of a polyester-polyurethane resin (hereinafter referred to as "polyester-polyurethane resin E") having a number-average molecular weight (Mn) of about 14,000, a ratio of the weight-average molecular weight (Mw) to the number-average molecular weight (Mn) of about 3.2 and Tg of about 30° C. and containing about 0.08 mmol/g of —OH and about 0.02 mmol/g of —SO$_3$Na, and 30% by weight of the phenoxy resin used in Example 9, so that the magnetic recording medium of Example 10 was prepared.

Example 11

Example 1 was repeated in the same manner as described above except that 2 parts by weight of a hardening agent (COLONATE-L manufactured by Nippon Polyurethane Industries Co., Ltd.) was further added to the magnetic coating material prepared in the same manner as in Example 10, so that the magnetic recording medium of Example 11 was prepared.

In the following Examples 12 and 13, the magnetic recording media containing lubricants having different compositions and contents were prepared. The lubricants used in magnetic coating materials of Examples 12 and 13 was composed of an ester-based lubricant having a melting point of not lower than 40° C. and a silicone oil.

Example 12

Example 6 was repeated in the same manner as described above except that the lubricant was composed of 50% by weight of the lubricant B and 50% by weight of a fatty acid ester (hereinafter referred to as "lubricant C") having a melting point of not lower than 40° C., so that the magnetic recording medium of Example 12 was prepared.

Example 13

Example 6 was repeated in the same manner as described above except that the lubricant was composed of 50% by weight of the lubricant B and 50% by weight of sorbitan tristearate (hereinafter referred to as "lubricant D"), so that the magnetic recording medium of Example 13 was prepared.

In the following Examples 14 to 19, the magnetic recording media containing binders composed of the polyester-polyurethane resin and cellulose derivatives were prepared. In the case where the cellulose derivatives were used in the binders, it was required that the polyester-polyurethane resin had a number-average molecular weight of not greater than 20,000, as described in Examples 14 to 19. In addition, the content of the polyester-polyurethane resin in the binder was in the range of 70 to 95% by weight while the content of the cellulose derivative was in the range of 5 to 30% by weight.

Example 14

Example 1 was repeated in the same manner as described above except that the binder was composed of 95% by weight of a polyester-polyurethane resin (hereinafter referred to as "polyester-polyurethane resin I") having a number-average molecular weight (Mn) of about 16,000, a ratio of the weight-average molecular weight (Mw) to the number-average molecular weight (Mn) of about 3.0 and Tg of about 45° C., and 5% by weight of nitrocellulose having a number-average molecular weight (Mn) of about 35,000 and Tg of about 150° C., so that the magnetic recording medium of Example 14 was prepared.

Example 15

Example 1 was repeated in the same manner as described above except that the binder was composed of 90% by weight of the polyester-polyurethane resin I and 10% by weight of nitrocellulose used in Example 14, so that the magnetic recording medium of Example 15 was prepared.

Example 16

Example 1 was repeated in the same manner as described above except that the binder was composed of 90% by weight of the polyester-polyurethane resin I and 10% by weight of acetyl cellulose having a number-average molecular weight (Mn) of about 55,000 and Tg of about 150° C., so that the magnetic recording medium of Example 16 was prepared.

Example 17

Example 1 was repeated in the same manner as described above except that the binder was composed of 80% by weight of a polyester-polyurethane resin (hereinafter referred to as "polyester-polyurethane resin J") having a number-average molecular weight (Mn) of about 15,000, a ratio of the weight-average molecular weight (Mw) to the number-average molecular weight (Mn) of about 3.2 and Tg of about 30° C. and containing 0.090 mmol/g of a polar group —COOH, and 20% by weight of nitrocellulose used in Example 14, so that the magnetic recording medium of Example 17 was prepared.

Example 18

Example 1 was repeated in the same manner as described above except that the binder was composed of 70% by weight of the polyester-polyurethane resin J and 30% by weight of nitrocellulose used in Example 14, so that the magnetic recording medium of Example 18 was prepared.

Example 19

Example 1 was repeated in the same manner as described above except that 2 parts by weight of a hardening agent (COLONATE-L manufactured by Nippon Polyurethane Industries Co., Ltd.) was further added to the magnetic coating material prepared in the same manner as in Example 17, so that the magnetic recording medium of Example 19 was prepared.

Next, for comparative purposes, the following Comparative Examples 1 to 15 were performed. Among them, Comparative Examples 1 to 7 were conducted for the comparison with Examples 1 to 11, Comparative Examples 8 to 15 were conducted for the comparison with Examples 12 and 13, and Comparative Examples 16 to 20 were conducted for the comparison with Examples 14 and 19.

Comparative Example 1

Example 1 was repeated in the same manner as described above except that the binder was composed of 100% by weight of the polyester-polyurethane resin A prepared in Example 1, so that the magnetic recording medium of Comparative Example 1 was prepared.

Comparative Example 2

Example 1 was repeated in the same manner as described above except that the binder was composed of 50% by weight of the polyester-polyurethane resin A and 50% by weight of a polyester-polyurethane resin (hereinafter referred to as "polyester-polyurethane resin F") having a number-average molecular weight (Mn) of about 17,000, a ratio of the weight-average molecular weight (Mw) to the number-average molecular weight (Mn) of about 2.8 and Tg of about 40° C., so that the magnetic recording medium of Comparative Example 2 was prepared.

Comparative Example 3

Example 1 was repeated in the same manner as described above except that the binder was composed of 50% by weight of the polyester-polyurethane resin A and 50% by weight of a polyester-polyurethane resin (hereinafter referred to as "polyester-polyurethane resin G") having a number-average molecular weight (Mn) of about 14,500, a ratio of the weight-average molecular weight (Mw) to the number-average molecular weight (Mn) of about 2.2 and Tg of about 40° C., so that the magnetic recording medium of Comparative Example 3 was prepared.

Comparative Example 4

Example 1 was repeated in the same manner as described above except that the binder was composed of 30% by weight of the polyester-polyurethane resin C and 70% by weight of the phenoxy resin used in Example 9, so that the magnetic recording medium of Comparative Example 4 was prepared.

Comparative Example 5

Example 1 was repeated in the same manner as described above except that the binder was composed of 90% by weight of the polyester-polyurethane resin A and 10% by weight of the polyester-polyurethane resin B both used in Example 1, so that the magnetic recording medium of Comparative Example 5 was prepared.

Comparative Example 6

Example 1 was repeated in the same manner as described above except that the binder was composed of 70% by weight of the polyester-polyurethane resin A and 30% by weight of the polyester-polyurethane resin B both used in Example 1, so that the magnetic recording medium of Comparative Example 5 was prepared.

Comparative Example 7

Example 6 was repeated in the same manner as described above except that the lubricant was composed of about 0.5 parts by weight of the lubricant A and about 0.5 parts by weight of the lubricant C, so that the magnetic recording medium of Comparative Example 7 was prepared.

Comparative Example 8

Example 6 was repeated in the same manner as described above except that the lubricant was composed of about 0.5 parts by weight of the lubricant A and about 0.5 parts by weight of myristic acid as a fatty acid (hereinafter referred to as "lubricant E"), so that the magnetic recording medium of Comparative Example 8 was prepared.

Comparative Example 9

Example 6 was repeated in the same manner as described above except that the lubricant was composed of about 0.5 parts by weight of the lubricant A and about 0.5 parts by weight of calcium stearate as a salt of a fatty acid (hereinafter referred to as "lubricant F"), so that the magnetic recording medium of Comparative Example 9 was prepared.

Comparative Example 10

Example 6 was repeated in the same manner as described above except that the lubricant was composed of about 0.5 parts by weight of the lubricant C and about 0.5 parts by weight of the lubricant F, so that the magnetic recording medium of Comparative Example 10 was prepared.

Comparative Example 11

Example 6 was repeated in the same manner as described above except that the lubricant was composed of about 0.5 parts by weight of the lubricant C and about 0.5 parts by weight of the lubricant E, so that the magnetic recording medium of Comparative Example 11 was prepared.

Comparative Example 12

Example 6 was repeated in the same manner as described above except that the lubricant was composed of about 0.5 parts by weight of the lubricant E and about 0.5 parts by weight of the lubricant B, so that the magnetic recording medium of Comparative Example 12 was prepared.

Comparative Example 13

Example 6 was repeated in the same manner as described above except that the lubricant was composed of about 0.5 parts by weight of the lubricant E and about 0.5 parts by weight of the lubricant F, so that the magnetic recording medium of Comparative Example 13 was prepared.

Comparative Example 14

Example 6 was repeated in the same manner as described above except that the lubricant was composed of about 0.5 parts by weight of the lubricant F and about 0.5 parts by weight of the lubricant B, so that the magnetic recording medium of Comparative Example 14 was prepared.

Comparative Example 15

Example 1 was repeated in the same manner as described above except that the binder was composed of 60% by weight of the polyester-polyurethane resin A and 40% by weight of nitrocellulose used in Example 14, so that the magnetic recording medium of Comparative Example 15 was prepared.

Comparative Example 16

Example 1 was repeated in the same manner as described above except that the binder was composed of 100% by weight of the polyester-polyurethane resin I alone, so that the magnetic recording medium of Comparative Example 16 was prepared.

Performance Evaluation Tests

The magnetic recording media prepared in Examples 1 to 11 and Comparative Examples 1 to 6 were cut into test samples having a size suitable for the performance evaluation tests mentioned below. The respective test samples were subjected to tests for evaluating magnetic properties, durability, traveling performance, physical properties and a coating property thereof.

The magnetic properties were measured by using a magnetic performance measuring apparatus (VSM). The test samples were measured for magnetic properties including, especially, a remanence ratio and a residual magnetic flux density thereof.

The durability was tested by traveling the respective test samples relative to a fixed magnetic head for 100 cycles to measure an amount of dust formed thereon. The evaluation of the durability of each test sample was made by comparing with a reference durability obtained in the test sample of Comparative Example 1. Specifically, the test sample of Comparative Example 1 was traveled for 100 cycles while contacting the fixed magnetic head. Thereafter, an adhesive tape was brought into contact with a surface of the fixed magnetic head so that the dust formed on the fixed magnetic head was transferred to the adhesive tape. The thus-obtained adhesive tape was used as a reference sample (100% dust tape). Further, 50% dust tape, 80% dust tape and 120% dust tape were prepared for subsequent comparisons.

The respective test samples from the magnetic recording media prepared in Examples 1 to 11 and Comparative Examples 1 to 7 were traveled for 100 cycles while bearing against the fixed magnetic head. The magnetic powder dust deposited on the surface of the fixed magnetic head after the 100 traveling cycles was transferred to an adhesive tape. The thus-obtained adhesive tapes were visually compared with the above-prepared reference dust tapes to determine percentages of the amounts of dust generated in the respective test samples. The results were classified into a first rank "O" for less than 50% dust formation, a second rank "Δ" for 50 to 120% dust formation and a third rank "X" for more than 120% dust formation.

The traveling performance was measured in terms of wow and flatter occurring upon tape-traveling. The traveling performance was also determined in percentage by the comparison with that of the test sample of Comparative Example 1 as a reference. The results were also classified into a first rank "O" for less than 50% wow and flatter, a second rank "Δ" for 50 to 120% wow and flatter and a third rank "X" for more than 120% wow and flatter.

The physical properties of the respective test samples were measured in terms of a breaking strength thereof. The measured breaking strength of each of the respective test samples was compared with a reference breaking strength obtained in the test sample of Comparative Example 1. The results were classified into a first rank "O" for more than 120% of the reference breaking strength, a second rank "Δ" for 85 to 120% of the reference breaking strength and a third rank "X" for less than 85% of the reference breaking strength.

The coating property of the test samples were measured in terms of a viscosity of each of the magnetic coating materials. The measured viscosity of each of the respective test samples was compared with a reference viscosity of the magnetic coating material for the test sample of Comparative Example 1. The results were classified into a first rank "O" for less than 60% of the reference viscosity, a second rank "Δ" for 60 to 100% of the reference viscosity and a third rank "X" for more than 100% of the reference viscosity.

The results of the afore-mentioned tests are shown in Table 1 below.

TABLE 1

| Example No. | Remanence ratio Rs [−] | Residual magnetic flux density Br [mT] | Durability | Traveling performance | Physical properties | Coating property | Tg [° C.] |
|---|---|---|---|---|---|---|---|
| Comparative Example 1 | 0.90 | 155 | Δ | Δ | Δ | Δ | 40 |
| Comparative Example 2 | 0.91 | 155 | Δ | Δ | Δ | Δ | 40 |
| Comparative Example 3 | 0.90 | 155 | Δ | Δ | Δ | Δ | 40 |
| Comparative Example 4 | 0.85 | 140 | Δ | Δ | X | Δ | 85 |
| Comparative Example 5 | 0.90 | 150 | Δ | Δ | O | Δ | 41 |
| Comparative Example 6 | 0.90 | 155 | Δ | Δ | O | Δ | 42 |
| Example 1 | 0.91 | 155 | Δ | Δ | O | O | 43 |
| Example 2 | 0.89 | 155 | Δ | Δ | O | O | 50 |
| Example 3 | 0.89 | 155 | Δ | Δ | O | O | 35 |
| Example 4 | 0.90 | 155 | Δ | Δ | O | O | 33 |
| Example 5 | 0.91 | 160 | Δ | Δ | O | O | 45 |
| Example 6 | 0.86 | 145 | O | O | O | O | 42 |
| Example 7 | 0.84 | 145 | O | O | O | Δ | 51 |
| Example 8 | 0.89 | 150 | O | O | O | Δ | 53 |
| Example 9 | 0.88 | 150 | O | O | O | O | 50 |
| Example 10 | 0.89 | 155 | O | O | O | O | 50 |
| Example 11 | 0.89 | 155 | O | O | O | O | 50 |

In addition, the magnetic recording media prepared in Examples 12 and 13 and Comparative Examples 7 to 14 were cut into test samples each having a size suitable for the performance evaluation test. The respective test samples were tested for friction coefficient and traveling durability to evaluate various properties thereof.

In the performance evaluation test, the evaluation of the friction coefficients was conducted by measuring maximum static friction coefficients ($\mu$) of the test samples when traveled while bearing against a magnetic head material at a low temperature (5° C.) and a high temperature (40° C). The thus-measured maximum static friction coefficients ($\mu$) were compared with a reference maximum friction coefficient ($\mu$) obtained in the test sample of Comparative Example 5. The results were classified into a first rank "O" for less than 80% of the reference maximum friction coefficient ($\mu$), a second rank "Δ" for 80 to 120% of the reference maximum friction coefficient ($\mu$) and a third rank for more than 120% of the reference maximum friction coefficient ($\mu$).

The traveling durability of each test sample was evaluated as follows. A 10 kHz signal was first recorded on each test sample. The signal-recorded test sample was traveled for 100 cycles at each of a low temperature (5° C.) and a high temperature (40° C.) while contacting the fixed magnetic head and thereafter subjected to a measurement of reproduction output level therefrom. The measured reproduction output level was then compared with a reference reproduction output level obtained in the test sample of Comparative Example 5 in which a commercially available magnetic tape was used. The results were classified into a first rank "O" for more than 130% of the reference reproduction output level, a second rank "Δ" for 70 to 130% of the reference reproduction output level and a third rank "X" for less than 70% of the reference reproduction output level.

The results of the tests for the friction coefficient and the traveling durability are shown in Table 2.

TABLE 2

| Example No. | Friction Coefficient | | Traveling durability | |
|---|---|---|---|---|
| | Low Temperature (5° C.) | High Temperature (40° C.) | Low Temperature (5° C.) | High Temperature (40° C.) |
| Comparative Example 7 | Δ | Δ | Δ | Δ |
| Comparative Example 8 | O | X | Δ | X |
| Comparative Example 9 | Δ | X | Δ | X |
| Comparative Example 10 | X | Δ | X | Δ |
| Comparative Example 11 | Δ | X | Δ | Δ |
| Comparative Example 12 | Δ | Δ | Δ | X |
| Comparative Example 13 | Δ | X | X | X |
| Comparative Example 14 | X | Δ | X | O |
| Example 12 | O | O | Δ | Δ |
| Example 13 | O | O | Δ | O |

Furthermore, the magnetic recording media prepared in Examples 14 to 19 and Comparative Examples 15 and 16 were tested for evaluating various properties including magnetic properties, durability, traveling performance, physical properties and coating property, in the same manner as in Examples 1 to 12 and Comparative Examples 1 to 6.

The results of the performance evaluation tests are shown in Table 3.

Examples. Specifically, when the binder contained the polyester-polyurethane resins having a lower molecular weight, the magnetic recording media could provide good results as compared with the existing magnetic recording media in which a binder composed of the polyester-polyurethane resin composition having a relatively high molecular weight and a relatively narrow molecular-weight distribution.

When the polar group was introduced into the polyester-polyurethane resin as a binder, the dispersibility of the magnetic powder in the binder was further enhanced. In addition, when the hardening agent was added to the binder for cross-linking thereof, the durability of the resultant magnetic recording media was improved. Furthermore, when the polyester-polyurethane had a glass transition point ranging from 20 to 80° C., optimum conditions of the magnetic recording media could be obtained.

Also, as will be apparently appreciated from the results of the remanence ratios and residual magnetic flux densities, the use of the polyester-polyurethane resin in the binder did not adversely affect at all the magnetic properties of the resultant magnetic recording media and could still maintain good magnetic properties.

On the other hand, when the glass transition point of the polyester-polyurethane resins used in the binder was lower than 20° C. or higher than 80° C., the resultant magnetic recording medium exhibited deteriorated durability due to the increase in friction coefficient or the like upon traveling at room temperature, which leads to difficulty in assuring reliability thereof.

As described above, in accordance with the present invention, since the polyester-polyurethane resin having a low number-average molecular weight and a wide molecular-weight distribution is used as the binder, the resultant magnetic recording medium is superior not only in durability and traveling reliability but also in static magnetic properties and electromagnetic transduction characteristics.

Also, as will be appreciated from Table 2, the magnetic recording media prepared in Examples 12 and 13 exhibited more stabilized friction coefficients and more excellent traveling durability than those prepared in Comparative Examples 7 to 14. Specifically, by using the lubricant composed of the ester-based lubricant having a melting

TABLE 3

| Example No. | Remanence ratio Rs [—] | Residual magnetic flux density Br [mT] | Durability | Traveling performance | Physical properties | Coating property | Tg [° C.] |
|---|---|---|---|---|---|---|---|
| Comparative Example 15 | 0.87 | 150 | O | O | O | X | 62 |
| Comparative Example 16 | 0.91 | 160 | Δ–X | Δ | Δ | O | 45 |
| Example 14 | 0.89 | 160 | Δ | Δ | O | O | 50 |
| Example 15 | 0.89 | 160 | O | O | O | O | 56 |
| Example 16 | 0.86 | 145 | O | O | O | Δ | 56 |
| Example 17 | 0.88 | 150 | O | O | O | O | 54 |
| Example 18 | 0.85 | 150 | O | O | O | Δ | 66 |
| Example 19 | 0.85 | 150 | O | O | O | Δ | 54 |

As will be appreciated from the afore-mentioned results of the performance evaluation tests as shown in Table 1, it was confirmed that the magnetic recording media using the polyester-polyurethane resin according to the present invention exhibited excellent durability, traveling performance, physical properties and coating property as compared with those of the magnetic recording media of Comparative point of not lower than 40° C. and a silicone oil, the resultant magnetic recording media could exhibit a good friction coefficient in both low- and high-temperature conditions, and the reproduction output thereof could be maintained at a high level even after traveling for a long period of time.

Especially, in the case where a cyclic alkyl ester was used as the ester-based lubricant, the traveling durability of the resultant magnetic recording medium was considerably improved. Incidentally, when the afore-mentioned ester-based lubricant is used together with a solid lubricant such as graphite, the friction coefficient and the traveling durability of the resultant magnetic recording medium were further improved.

Also, as will be appreciated from Table 3, when the binder was composed of 70 to 95% by weight of the polyester-polyurethane resin having a number-average molecular weight (Mn) of not more than 20,000 and a ratio of the weight-average molecular weight (Mw) to the number-average molecular weight (Mn) of not less than 2.5 and 5 to 30% by weight of the cellulose derivatives, the resultant magnetic recording media were superior in durability, traveling performance, physical properties and coating property to those obtained in Comparative Examples.

Especially, when the content of the cellulose derivatives in the binder was in the range of 10 to 20% by weight, more preferred results could be obtained. Further, when the polar group was introduced into the polyester-polyurethane resin, the dispersilbility of the magnetic powder in the magnetic coating material was further enhanced. Furthermore, when the hardening agent was added to the magnetic coating material for cross-linking thereof, it was confirmed that the durability of the resultant magnetic recording media was improved. When the polyester-polyurethane resin had a glass transition point ranging from 20° C. to 80° C., the resultant magnetic recording media could exhibit optimum properties.

Conversely, when the glass transition point of the polyester-polyurethane resin was lower than 20° C. or higher than 80° C., it was recognized that the durability of the magnetic recording medium was deteriorated due to the increase in friction coefficient or the like upon traveling at room temperature, which resulted in difficulty in assuring the reliability thereof. When the existing polyester-polyurethane resin having a large molecular weight was used in combination with the cellulose derivatives, stability of the magnetic coating material was deteriorated, so that the magnetic recording medium was found to be practically unusable. In addition, in case the binder contained 40% by weight of the cellulose derivatives, the stability of the magnetic coating material was considerably deteriorated and other properties thereof were also remarkably lowered.

As described hereinbefore, in accordance with preferred embodiment of the present invention, by adding a given amount of the cellulose derivatives to the polyester-polyurethane resin, the resulting magnetic recording medium also shows not only good durability and traveling reliability but also improved static magnetic properties and electromagnetic transduction characteristics.

What is claimed is:

1. A magnetic recording medium comprising:

a non-magnetic substrate and a magnetic layer disposed on said substrate, said magnetic layer comprising a magnetic powder, a binder and a lubricant, wherein said binder comprises from about 70 to about 95% by weight of a polyester-polyurethane resin containing from about $1.0 \times 10^{-6}$ to $1.0 \times 10^{-2}$ equivalent weights of a polar functional group selected from the group consisting of $-SO_4M$, $-SO_3M$, $-SO_2M$, $-NH_2$, $-NR_2$, $-NR_3$, $-OH$, $-OPO_3M_2$, and $-OPO_3R_2$, wherein M is hydrogen or an alkali metal and R is an alkyl group, alkenyl group or an alkoxy group per gram of polyester-polyurethane resin and having a number-average molecular weight ($M_n$) of not greater than 16,000, a ratio of a weight-average molecular weight ($M_w$) to the number-average molecular weight ($M_n$) of not smaller than 2.5, and a glass transition temperature of 20° to 80° C.; and from about 5 to about 30% by weight of a cellulose derivative; and wherein said lubricant comprises a cyclic alkyl ester having a melting point not lower than 40° C. and a silicone oil.

2. A magnetic recording medium as defined in claim 1, wherein said cellulose derivative is selected from nitrocellulose or acetyl cellulose.

3. A magnetic recording medium as defined in claim 1, wherein said magnetic layer further comprises a polyisocyanate-based hardening agent.

* * * * *